April 20, 1965  R. N. WINDSOR  3,179,135
MACHINE FOR FINGER-JOINTING BOARDS
Filed Dec. 6, 1962  2 Sheets-Sheet 1
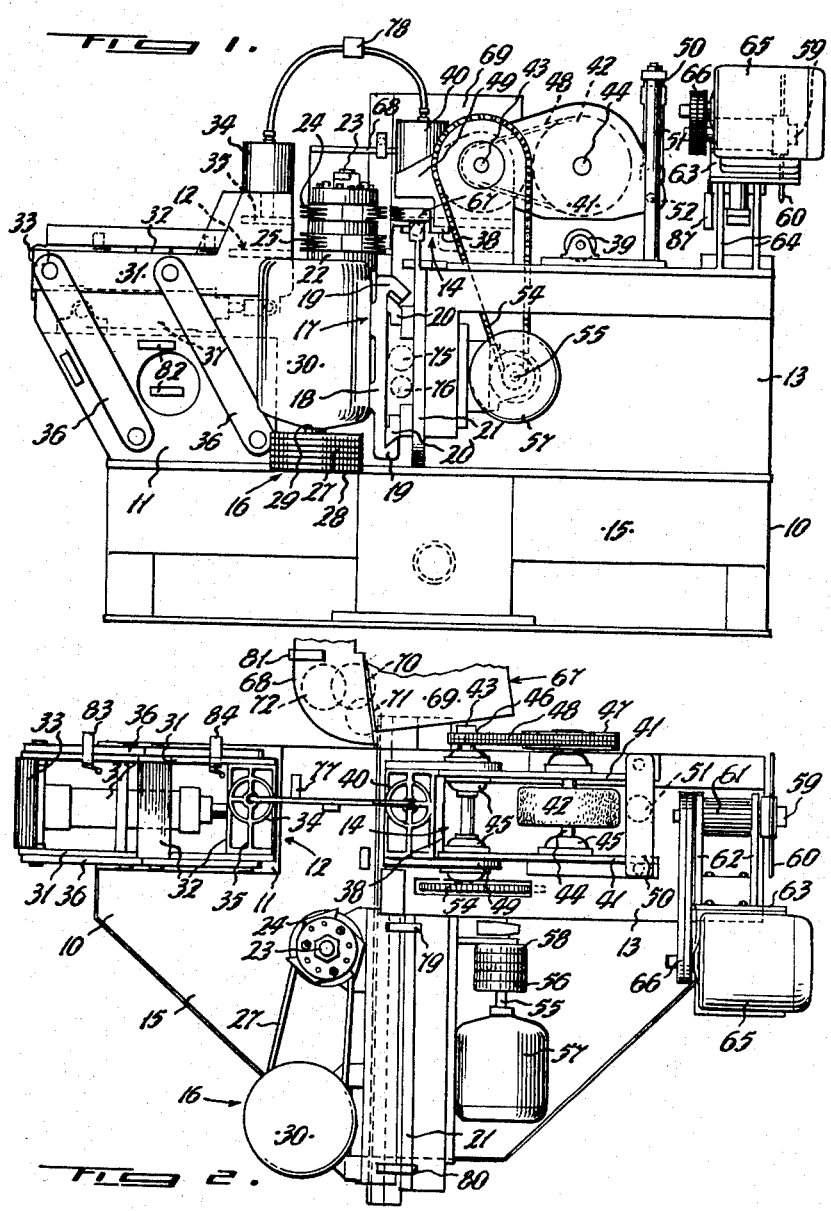

April 20, 1965  R. N. WINDSOR  3,179,135
MACHINE FOR FINGER-JOINTING BOARDS
Filed Dec. 6, 1962
2 Sheets-Sheet 2

United States Patent Office 3,179,135
Patented Apr. 20, 1965

3,179,135
MACHINE FOR FINGER-JOINTING BOARDS
Robert Newman Windsor, Stafford, Brisbane, Queensland, Australia, assignor to R. L. Windsor & Son Pty. Ltd., Brisbane, Queensland, Australia, a company of Australia
Filed Dec. 6, 1962, Ser. No. 242,823
7 Claims. (Cl. 144—3)

This invention relates to a new and improved machine for finger-jointing boards.

The end-jointing of short length boards is now being increasingly practised, thus allowing producers to make saleable lengths from offcuts and short stock, to produce timber in the exact lengths required by users, and also enabling the grade of a product to be raised by docking out certain faults. Of the various types of end-jointing, the most efficient has been found to be finger-jointing, wherein the mating ends of the two boards to be joined are formed with fingers and grooves, respectively, so that the two boards may be firmly joined by a wedging action, glue having been applied prior to bringing the ends together. For the continuous commercial production of finger-jointed boards, various types of machines have been proposed, but all of these are of such design that they have one or more of the serious disadvantages of being very costly; being bulky and requiring a large floor space and working area; being of complex nature and requiring the services of a relatively large number of operatives; having a number of separate successive operations requiring excessive handling, and thus not being fully automatic, or having unduly low overall efficiency by virtue of the limitations imposed by certain of the separate operations.

Our present invention has been devised to overcome the aforesaid disadvantages associated with the previously-proposed finger-jointing machines, and it accordingly has for its principal object the provision of a machine of relatively simple and inexpensive construction which may be easily used by a single operative for the required purpose of providing a finger-joint.

Another object of the invention is to provide a machine of the aforementioned nature which may perform automatically most or all of the operations of feeding, joining, discharging and docking to required lengths.

Yet another object of the invention is to provide a finger-jointing machine of the character described which will be of very compact construction, thus requiring little floor space, and may be used to provide a joint in the least possible time without time-wasting operations and excessive handling.

Other objects and advantages of the invention will be hereinafter apparent.

With the foregoing and other objects in view, my invention resides broadly in a finger-jointing machine having substantially longitudinally-aligned first and second cutting tables whereon boards may be arranged in parallel or longitudinally-aligned relationship with their adjacent ends spaced from one another; clamping means adapted to be actuated to clamp the boards on the said cutting tables; cutting means normally disposed clear of the said cutting tables but adapted to be moved to a position whereat cutting of mating members in the respective adjacent ends of the boards on the cutting tables is effected, whereafter the cutting means may be returned clear of the cutting tables so that adhesive may be applied to one of the mating members of the boards, and means whereby the mating ends of the boards may be brought into engagement in longitudinal alignment after adhesive has been applied to the said one of the members. Other features of the invention will become apparent from the following description.

In order that the invention may be more readily understood and put into practical effect, reference will now be made to the accompanying drawings, wherein:

FIG. 1 is a side elevational view of one form of finger-jointing machine in accordance with our invention;

FIG. 2 is a plan view of the finger-jointing machine shown in FIG. 1, and

Figure 3:
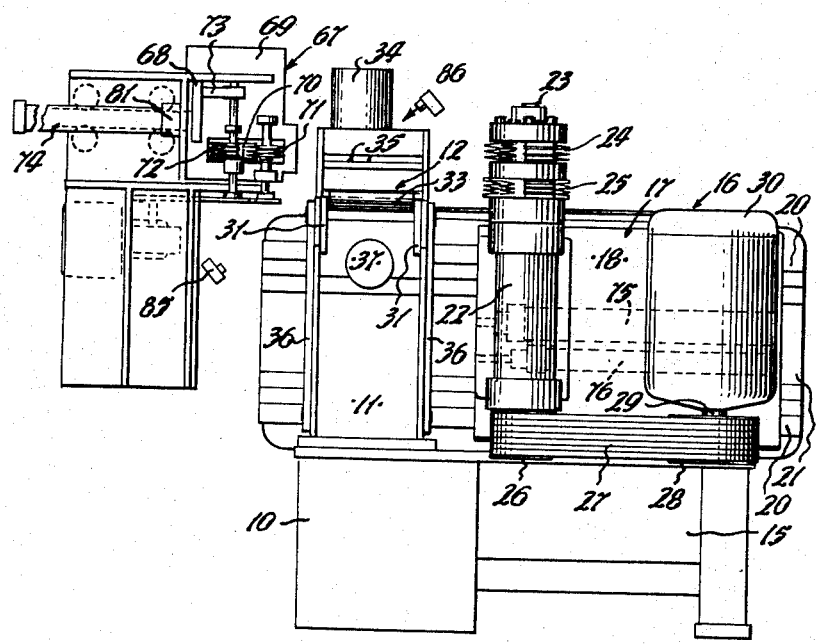
FIG. 3 is an end view of the machine from the infeed side thereof.

The finger-jointing machine shown in the drawings has a rectangular, hollow box-like first base portion 10 supporting at one end a mounting pedestal 11 for a first or movable cutting table 12, this end of the base portion 10 being the infeed end of the machine. The other end of the first base portion 10 is the discharge end and supports a mounting frame 13 for a second or fixed cutting table 14. To one side of the first base portion 10, there is a second base portion 15 which is substantially triangular in plan view and supports a laterally movable cutting assembly 16.

The cutting assembly 16 is mounted on a saddle 17 comprising a vertical transverse plate 18 having upper and lower hooked flanges 19 engaging slidably with horizontal transverse guide bars 20 fixed to a vertical transverse frame plate 21 of the mounting frame 13 and extending the full width of the machine. The inner end of the saddle 17 has secured thereto a vertical bearing sleeve 22 housing a vertical cutter shaft 23 upon the upper end of which is removably secured a pair of upper and lower rotatable cutting heads 24 and 25, respectively. The upper cutting head 24 is adapted, when moved transversely across the end of a board, to make a grooved female jointing end, while the lower cutting head 25 will make a grooved jointing end which is a male end to fit into the female end. The lower end of the shaft 23 below the bearing sleeve 22 has pulleys 26 secured thereon, and these are connected by V-belts 27 to similar but larger pulleys 28 at the lower end of a drive shaft 29 extending down vertically from an electric motor 30 arranged parallel to the cutter shaft 23 at the outer end of the saddle 17. Thus, the cutting assembly 16 is slidable transversely across the machine with the cutter shaft 23 being rotated by the motor 30, the shaft 29 of the latter moving with the shaft 23 in vertical parallelism. When the rotating cutting heads 24 and 25 are brought to between the first and second cutting tables 12 and 14, they will cut transversely across the ends of boards at different heights, so that fingers and grooves will be formed, as previously mentioned, to interfit when the ends are brought together.

The movable cutting table 12 at the infeed end of the machine has a pair of spaced parallel, horizontal, longitudinal bars 31 interconnected at their inner ends by a pair of transverse table plates 32 and at their outer ends by a transverse roller 33, the upper periphery of the latter being at the same height as the top surfaces of the table plates 32 so that a board may rest horizontally thereon on the movable table 12. The table 12 is shown in the drawings in its cutting-height position, in which a board thereon will be at the same height as the lower cutting head 25. There is also provided, as an ancillary fixture, an infeed conveyor device (not shown) of standard construction to carry boards to the table 12 in the infeed direction at such height that they will pass on to the table 12 when it is in the cutting-height position shown in the drawings.

Above the table plate 32 at the inner end of the table 12, there is mounted fixedly on the table 12 an overhead clamping cylinder 34 having a vertical ram and horizontal clamping plate 35 adapted to be pneumatically operated to clamp a board on the movable table 12. At each side of the table 12, there are provided two normally-inclined, parallel pivoted linkage arms 36 having their upper ends pivoted to the bars 31 of the table 12 and their lower ends pivoted to the pedestal 11. These pivoted linkage arms 36 are inclined upwardly and outwardly, as illustrated, in the initial cutting-height position of the table 12, but they may be brought to vertical attitudes so that the table 12 is swung upwards and towards the other or fixed table 14 to bring a grooved male-end board from a lower to a higher position at the same height as the upper cutting head 24, and across and into engagement with the female end of a board on the fixed table 14. For the purpose of moving the movable first table 12 in this manner, we provide a pneumatically-operable ram and cylinder 37 arranged longitudinally beneath the movable table 12, as illustrated.

The second or fixed cutting table 14 includes a fixed transverse table plate 38 mounted on a block on the mounting frame 13 and adapted to support the rear end of a board at the level of the upper cutting head 24, there also being a transverse roller 39 about midway along the frame 13 and having its upper periphery at the same height as the upper surface of the table plate 38 so that the joined boards may be moved longitudinally and horizontally out of the machine. Above the transverse table plate 38 is a second clamping cylinder device 40 which is pneumatically-operable in the same manner as the cylinder 37 of the movable table 12, so that a second board may be held on the fixed table 14 for its rear end to be engaged by the upper cutting head 24.

On the mounting frame 13 for the fixed second table 14, at the discharge side of the clamping cylinder 40, we provide a pair of pivoted supporting arms 41 for a pressure roller or wheel 42 with a rubber or the like periphery (preferably being rubber-tired and pneumatic to afford a softer and therefore larger engagement area) adapted to be rotated to engage frictionally with the joined board to move it in the discharge direction. The supporting arms 41 are pivoted towards the clamping cylinder 40 about a rotatable transverse shaft 43, while towards their other ends they carry another rotatable transverse shaft 44 upon which is secured the pressure roller 42 directly above the roller 39 of the fixed table 14. The two shafts 43 and 44 are suitably journaled in bearings 45 and have their extended ends at the side of the machine opposite the cutting assembly 16 provided with sprockets 46 and 47 respectively, drivably interconnected by an endless chain 48. The shaft 43 is fixed in position on mounting brackets 49, and it may be rotated to drive the other shaft 44 and the friction-type pressure roller 42, the two latter components being pivotable about the rotatable but otherwise fixed shaft 43 so as to be adjustable as to height.

For adjustment of the height of the pressure roller 42 there is provided a mounting arch 50 near to the discharge end of the machine and pivotally supporting a vertical, pneumatically-operable cylinder and ram 51, the lower end of the ram being pivotally connected to a transverse connecting bar 52 beween the ends of the supporting arms 41, so that a constant down-pressure may be exerted to ensure that the pressure roller 42 will grip joined boards between it and the roller 39, irrespective of the thickness of the boards.

The drive for the shaft 43 may be by sprockets and an endless chain 54 on the cutting assembly side of the table 14 from a lower transverse drive shaft 55 connected by a clutch 56 to a coaxial transverse electric motor 57, the clutch 56 having a brake device 58 and being of the electrically-actuated, magnetic, speed-control type in which its gripping effect on the shaft 55 is commensurate with the current passing through the clutch.

Directly above the discharge path of the joined boards at the discharge end of the machine, there is pivoted a longitudinal shaft 59 carrying a rotatable docking saw 60 for rotation in a vertical transverse plane at the end of the machine, the shaft 59 being carried in a bearing which is connected by transverse pivot arms 62 to a motor mounting 63 which is pivoted on a frame 64 so that the shaft 59 may be swung downwards to move the docking saw 60 into contact with a joined board at predetermined intervals. The shaft 59 may be rotated by an electric motor 65 on the motor mounting 63 by means of pulleys and belts 66.

The machine also includes a gluing mechanism 67 on the side opposite the cutting assembly 16 and mounted on a subframe 68. The gluing mechanism 67 including a tank 69 adapted to contain suitable adhesive and having its lower part about level with the upper cutting head 24. A main female grooved roller 70 is rotatable about a fixed vertical axis with its periphery entering the tank 69 through an aperture therein so as to carry adhesive from the tank, while a doctor roller 71 has its male-grooved periphery engaging with the main roller 70 at the same peripheral speed, the doctor roller 71 also entering the tank 69 and being adapted, in known manner, to carry excess adhesive back to the tank to prevent clogging. There is also an applicator roller 72 of male-grooved form mounted for free rotation about a vertical axis on a slide bracket 73 adapted to be moved horizontally and transversely by a pneumatic cylinder 74 and ram. The slide bracket 73 also has a guide stem (not shown) on the discharge side of the cylinder 74 and parallel thereto, this stem being retained slidably between upper and lower grooved rollers so as to support the applicator roller 72 in its path of movement. The applicator roller 72 may be moved between a withdrawn position, as illustrated, and an inner position in which it brushes past the female end of a board on the fixed table 14 to apply adhesive thereto.

The movement of the saddle 17 is effected by a further pneumatically-operable cylinder 75 and ram arranged transversely therebeneath and having a hydrocheck cylinder device 76. The apparatus also includes a number of microswitches as mentioned hereinafter, whereby all operations may be performed automatically and successively. Also, there are electrical connections and hose connections for the supply of pressure air, these being omitted from the drawings for the purpose of clarity.

In the operation of the machine, assuming that a board is initially located on the discharge side of the machine on the fixed second cutting table 14 with its trailing end adjacent the cutting area, a first board may be pushed along the infeed conveyor (not shown) and on to the movable table 12 to take up a position with its leading end adjacent the cutting area, this table 12 being in the lowered attitude so that the first board will be aligned with the lower cutting head 25 at a lower level than the second board on the fixed table 14 which is aligned with the upper cutting head 24.

As the leading end of the first board reaches the correct cutting position, a microswitch 77 is actuated to bring both clamping cylinders 34 and 40 into effect to hold the ends of the boards ready for cutting. At the bottom of the clamping strokes, an adjustable electrical pressure switch 78 in the clamping circuit acts to actuate the pneumatic cylinder 75 for the cutting assembly 16 to move the saddle 17 and cutting heads across from the clear side of the frame, the upper and lower rotating cutters 24 and 25 then cutting transversely across the ends of the boards to form the mating ends, a male end being made in the board on the table 12, while a female end is made in the board on the table 14.

At the end of the cutting stroke, a microswitch 79 reverses the direction of movement of the saddle 17 so that the cutting heads will be withdrawn to return to clear positions. However, prior to this, as the inner end of the saddle 17 reaches innermost position, it contacts a manual valve (not shown) operating the gluing cylinder 74 so that the applicator roller 72 will follow the saddle in its return movement and will apply glue to the female joint at the fixed table 14. As the applicator roller 72 completes its function, its carrier actuates a poppet valve controlling a pneumatic pilot for the aforementioned manual valve, acting to reverse the cylinder 74 and return the applicator roller 72 to its initial withdrawn position. As the saddle 17 then returns to fully-withdrawn position, a microswitch 80 acts to move the ram of the cylinder 37, the switch 80 acting in conjunction with another microswitch 81 which is in parallel therewith and is actuated as the applicator roller 72 returns to outermost position, so that both switches 80 and 81 must be actuated before the cylinder 37 may operate.

The cylinder 37 then operates to swing the movable table 12 upwards and towards the second or fixed table 14, the male end of the first board then being wedged firmly into engagement with the female end of the second board as the linkage arms 36 come to vertical attitudes, the clamping cylinders 34 and 40 still being operative. As the boards are joined together, the linkage arms 36 actuate two further microswitches 82 which act to de-energise the clamping cylinders 34 and 40 and engage the electrically-operated clutch 56 to commence rotation of the pressure roller 42 and so start discharge of the joined boards, the movable table 12 still being raised.

As the trailing end of the joined board passes the movable table 12, a microswitch 83 acts to reduce the speed of the shaft 55 by means of the clutch 56 so that the speed of the pressure roller 42 is reduced, thus decelerating the rate of discharge. On further movement of the trailing end, another microswitch 84 causes the cylinder 37 to return the movable table 12 to its lower position. Then, as the trailing end of the joined board reaches its higher cutting position on the second fixed table 14, a photoelectric cell 85 and light source 86 therefore act to stop the pressure roller 42 completely and prevent further discharging movement.

For the operation of the docking saw 60, we may provide a discharge conveyor (not shown) on the discharge end of the machine to carry the joined boards, and as each board reaches a predetermined position thereon, an adjustably-located microswitch (not shown) is contacted to stop the friction wheel or pressure roller 42 and cause the docking saw 60 to swing downwards to cut the board and then a snap-lock microswitch 87 acts to firstly reverse the saw 60 to return to uppermost position and then recommence movement of the pressure roller 42. These sequences of operations may be repeated continuously so that any number of lengths of boards of the same desired size may be formed from the short lengths which the invention has been devised to utilise.

While the particular form of the invention herein described and illustrated will be found very effective in achieving the objects for which the invention has been devised, it will be apparent that many modifications of constructional detail and design may be made without departing from the scope and ambit of the invention, as defined by the appended claims.

What is claimed is:

1. A finger-jointing machine comprising, the combination of, a first clamping means for rigidly clamping a first board, a second clamping means for rigidly clamping a second board in parallel relationship with respect to the first board, mounting means for said second clamping means and providing limited movement of said second clamping means and the second board clamped thereby between a first position and a second position, said first position being such that the first and second boards are parallel and are offset transversely and longitudinally and said second position being such that said first board and second board are in abutting end-to-end relationship, said mounting means comprising pivot means, said pivot means forming a parallelogram linkage structure which swings said second clamping means and the second board between said first position and said second position, power means to move said second clamping means and the second board from said first position to said second position, and cutting means which is operative when said second clamping means is in said first position to cut the ends of the respective first and second boards to provide mating end formations whereby the second board may be moved to mating relationship with the first board.

2. Apparatus as described in claim 1 wherein said parallelogram linkage structure comprises four parallel links mounted upon two spaced structure axes and said second clamping means, and wherein said cutting means comprises a pair of cutting heads rigidly mounted upon a single shaft extending transversely of the general plane of the two fixed axes of said parallelogram linkage structure.

3. A finger-jointing machine as described in claim 2 which includes slide means mounting said cutting means for movement past said ends of said boards to perform the cutting operations thereon.

4. A finger-jointing machine as described in claim 2 wherein said first clamping means and said second clamping means clamp said boards in horizontal positions with the second board being at a lower level than the first board when said clamping means is in said first position, and wherein said links are at an acute angle from the vertical when said second clamping means is in said first position and are substantially vertical when said second clamping means is in said second position.

5. A finger-jointing machine as described in claim 1 which includes a pressure roller mounted for rotation about an axis parallel to a first board clamped by said first clamping means adapted to frictionally engage the second board and to move it from said second clamping means when released thereby.

6. A finger-jointing machine as described in claim 1 which includes adhesive-applying means for automatically applying adhesive to the ends of the boards after the cutting operations have been completed.

7. A finger-jointing machine as described in claim 5 which includes means to move said adhesive-applying means automatically from a rest position along a path to perform the adhesive applying operations.

References Cited by the Examiner

UNITED STATES PATENTS

| 1,496,982 | 6/24 | Dunham | 144—3 |
| 1,803,020 | 4/31 | Kalgren | 144—91 |
| 2,409,777 | 10/46 | Maurer | 156—558 |

FOREIGN PATENTS

| 167,818 | 6/56 | Australia. |
| 529,269 | 12/21 | France. |
| 20,612 | 9/09 | Great Britain. |

WILLIAM W. DYER, JR., *Primary Examiner.*